Nov. 3, 1964   R. N. SMITH ETAL   3,155,056
PLASTIC OR DOUGH MIXING APPARATUS
Filed Aug. 26, 1959   3 Sheets-Sheet 1

INVENTOR.
RICHARD N. SMITH
JOSEPH A. ZANG
BY
Bradley Cohn

Nov. 3, 1964  R. N. SMITH ETAL  3,155,056
PLASTIC OR DOUGH MIXING APPARATUS
Filed Aug. 26, 1959                          3 Sheets-Sheet 2

INVENTOR.
RICHARD N. SMITH
JOSEPH A. ZANG
BY

Nov. 3, 1964   R. N. SMITH ETAL   3,155,056
PLASTIC OR DOUGH MIXING APPARATUS
Filed Aug. 26, 1959   3 Sheets-Sheet 3

INVENTOR.
RICHARD N. SMITH
JOSEPH A. ZANG
BY
Bradley Cohn

3,155,056
PLASTIC OR DOUGH MIXING APPARATUS
Richard N. Smith, Fairfield, Conn., and Joseph A. Zang, Rockville Centre, N.Y., assignors to American Machine & Foundry Company, a corporation of New Jersey
Filed Aug. 26, 1959, Ser. No. 836,206
9 Claims. (Cl. 107—36)

This invention relates to mixing machines for highly viscous substances, such as pastes, plastics and doughy masses where it is desired to obtain intensive stretch, compression and shear and more particularly a unique balance betwen stretch, compression and shear. In processes which involve chemical or physical changes resulting from mechanical action, it is particularly desirable to obtain an intensive mechanical working as well as uniform treatment of the material and, in the case of continuous processing, uniform passage of material through the machine. Thus, it is an object of the invention to avoid stagnation of material in any part of the mixer.

It is a particular object of the invention to provide a device used or useful in mixing and/or developing doughs and batters and more particularly bread doughs and may be applied also in the processing of plastics.

In recent years, considerable effort has been devoted to material handling equipment for continuous processing of bread doughs. The mixing of the total ingredients into a developed dough is generally performed in a mixing device now known in the art as a developer. The function of the developer is to effect certain well recognized changes in the properties of the mix treated. While this probably involves alignment or orientation of long chain molecules to produce a network, the precise physico-chemical mechanics are incompletely understood. However, we have found that a proper combination of the three basic forces of shear, stretch and compression are necessary for a rapid efficient development without degradative loss. These same principles, of course, can be applied to other materials where analogous orientation or alignment of molecules is desired.

It is an object of the invention to provide a device which will rapidly and efficiently transform the ingredients of dough into a developed dough suitable for baking into a satisfactory bread.

It is a further object of the invention to provide a developer which may produce pulsating moderate to high mechanical pressures on the dough to provide a unique action on the dough to assist in securing the proper relative amounts of compression, stretch, shear and kneading.

It is a further object of the invention to provide apparatus that may vary the balance between the applied forces of stress, shear and compression as may be required in treating various substances.

Still another object of the invention is to provide a closed mixer to confine the mix under any selected fluid pressure.

Still another object of the invention is to provide a mixer capable of a high power input or work input rate as required for effective dough development while minimizing power or work losses resulting from friction and dough damage.

It is still a further object of the invention to provide a means for effectively controlling the temperature by adding or removing heat to or from the mixer.

The novel features which are believed to be characteristic of the invention are set forth with particularity in the appended claims. The invention, itself, however, both as to its organization and method of operation may be understood by reference to the following description of an apparatus used in dough developing taken in connection with the accompanying drawings, in which:

Figure 1:
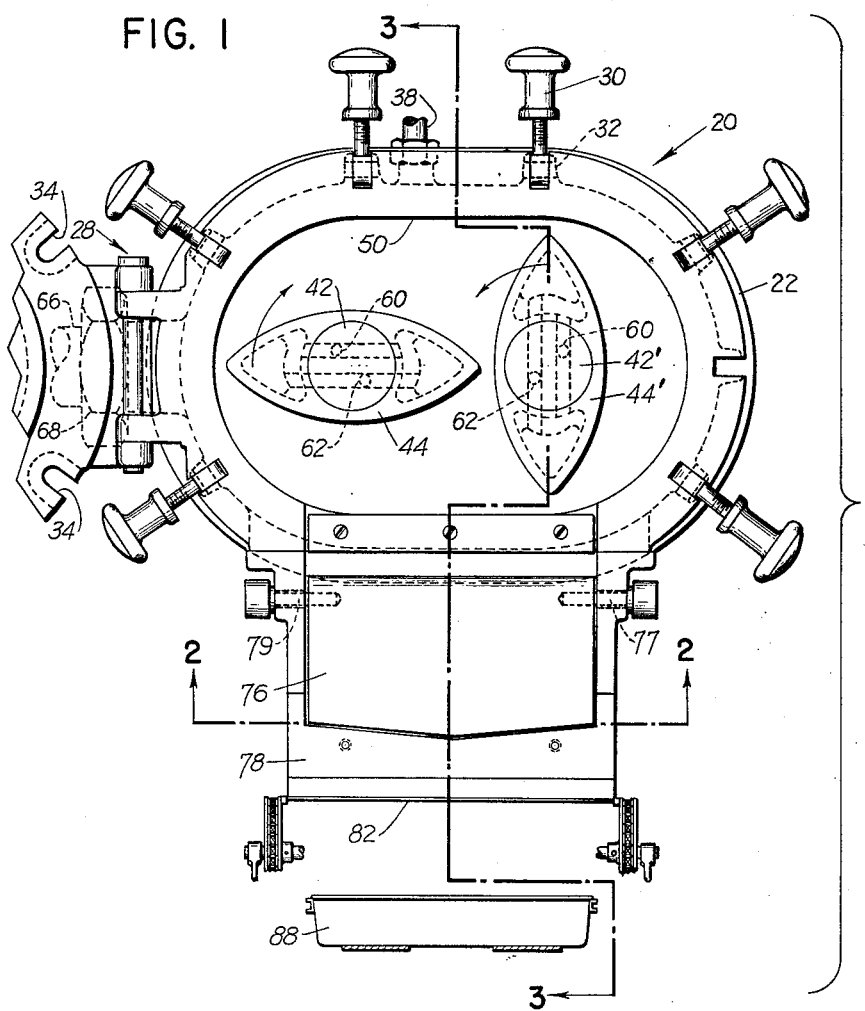
FIG. 1 is a front elevation of a dough developer with its front cover plate in open position and illustrated in conjunction with a delivery control throat and pan conveyor.
Figure 2:
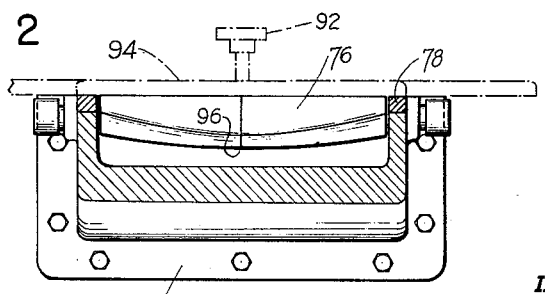
FIG. 2 is a sectional bottom view of the delivery control throat taken on line 2—2 of FIG. 1.

The housing 20 is ovoid in shape and has a rearward flange 22 to which is secured back plate 24 which is part of a supporting frame (not shown). Door-like front cover plate 26 is hingedly mounted by the hinge 28 and may be locked in fluid tight relationship by means of hinge mounted locking knobs 30 mounted in bosses 32 of housing 20 and engageable in the slots 34 of the front plate. The ovoid cylindrical housing may be jacketed or, as shown, have a hollow core 36. Inlet and exit conduits 38 and 40 are provided for circulating a temperature control fluid.

Figure 4:
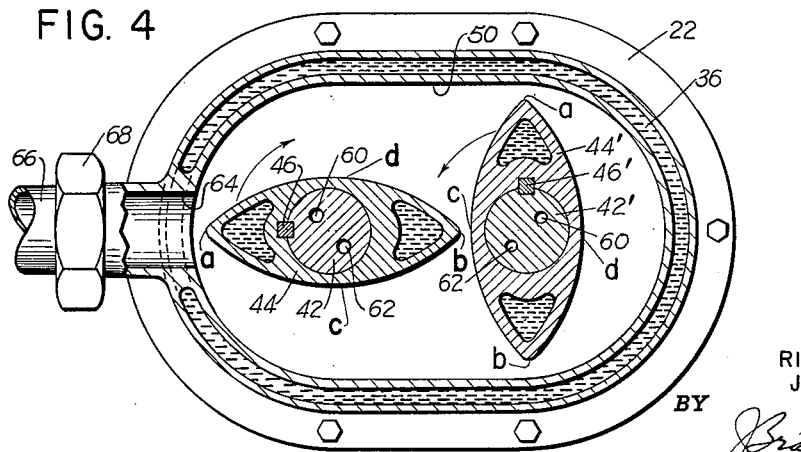
FIG. 4 is a sectional front elevation of the dough developer, taken on line 4—4 of FIG. 3.

Counter-rotating shafts 42 and 42' enter through the rear plate 24. On each of these shafts is mounted a twin arc paddle 44 and 44' which may be secured to rotate with the shafts by means of keys 46, 46'. In cross-section, the external contour of each paddle is formed as two 90° arcs bowed from each other and connected at their ends. The ends or tips are then rounded on a very small radius to avoid a cutting action and to minimize shear. With reference, for example, to FIG. 4, the arc, $a, c, b$ is a 90° arc as is the arc $a, d, b$.

Figure 3:
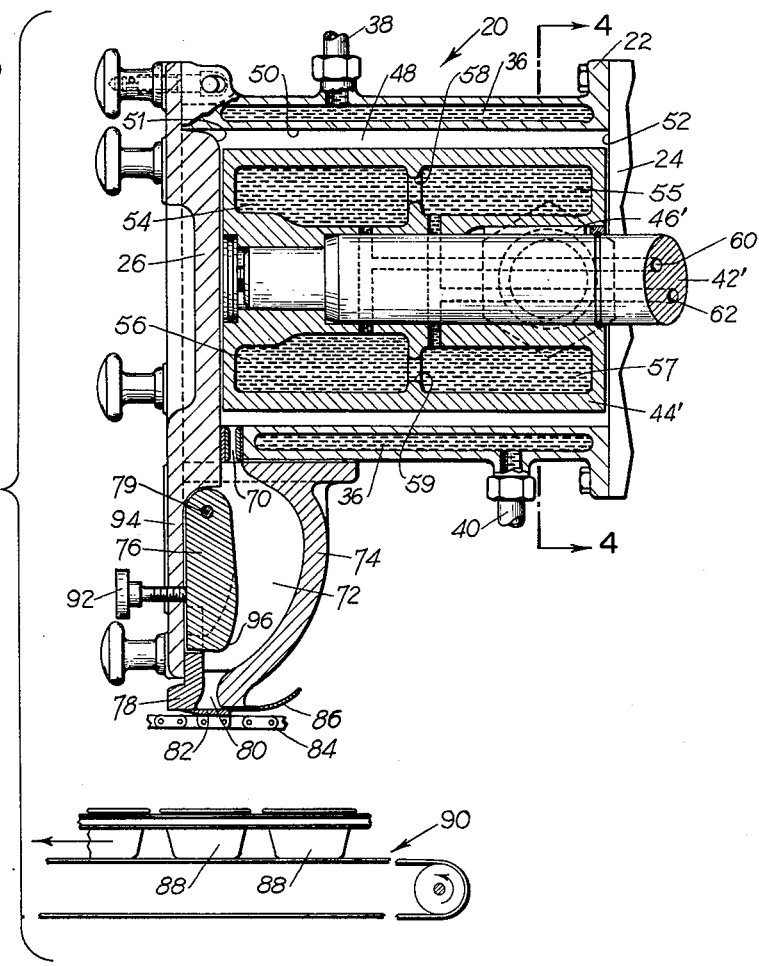
FIG. 3 is a sectional side elevation of the dough developer and delivery control throat, taken on line 3—3 of FIG. 1.

Each paddle 44, 44' extends, as may be seen in FIG. 3, the entire length of the chamber 48 which is bounded by the inner wall 50 of housing 20, inner face 52 of rear plate 24, and the inner face 51 of front plate 26.

Chambers 54, 55, 56 and 57 are formed in each paddle. Chambers 54 and 55 communicate through the passage 58 and chambers 56 and 57 communicate through the passage 59. A temperature control fluid may be pumped into chambers 54 and 56 through the T-shaped duct 60 and the fluid will then circulate to the chambers 55 and 57 and be exhausted through the T-shaped duct 62.

Ingredients are charged into the mixer through the port 64 and communicating conduit 66 secured by nut 68.

An elongated slit-like restricted opening 70 is formed in and between the housing 20 and the cover plate 26. This opening 70 communicates with a flow-controlling chamber including an adjustable shaper throat 72 formed by a rearward U-shaped shaper housing 74 and a forward adjustable forming lug or plate 76 swingably supported by pins 77 and 79 mounted in the side walls of housing 74. The bottom portion of U-shaped housing 74 has an attached member 78 forming with said housing 74 a delivery duct 80 through which the finished material, developed dough, is discharged or extruded.

Cut-off means are provided as by the traveling knife 82 mounted on an endless chain 84 to deliver discrete separate portions of dough A guide lip 86 is secured to housing 74 to provide a guide surface for the approach of knife 82 to duct 80.

Suitable receivers such as bake pans 88 may be intermittently indexed past and beneath extruding duct 80 and knife 82. The movement of the knife and indexing of the pans on conveyor 90 is co-ordinately timed by drive means not shown.

The lug 76 is pivoted on the pins 77 and 79 and may be adjusted inwardly and outwardly in the throat 72 by means of a turn knob 92 threaded in a suitable opening in the lower flange 94 of front plate 26. This permits variation in the volumetric size of throat 72. Additionally, lug 76 has a raised center portion 96 for shaping the column of dough to provide a suitable shape to the finally extruded dough piece. The restricted slit-like orifice 70, expanded throat 72 and restricted duct 80 provide gradual expansion and then gradual restriction to the dough for final uniform scaling and ultimate uniform crumb quality. The gradual sloping of the walls of throat 72 prevents stagnation and provides uniform dough delivery.

Figure 5:
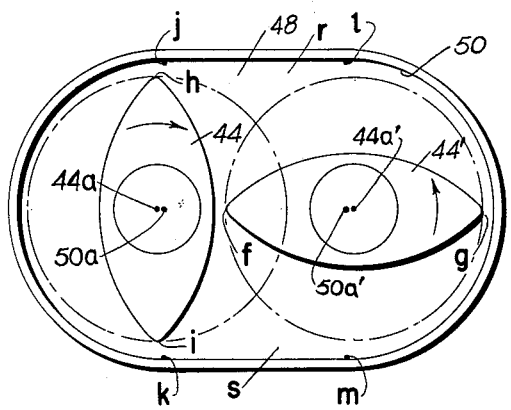
FIGS. 5 to 7 inclusive are diagrammatic views illustrating the successive steps of the paddles in the dough developer during developing action.
Figure 6:
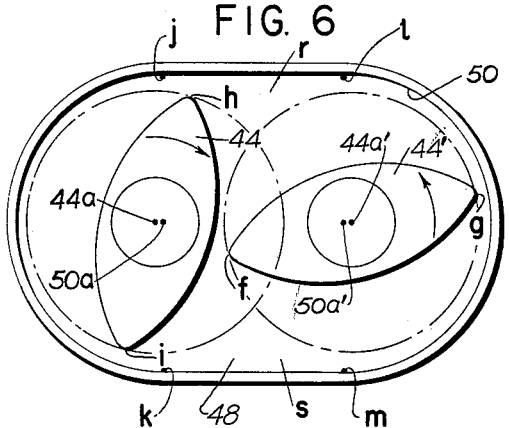
Figure 7:
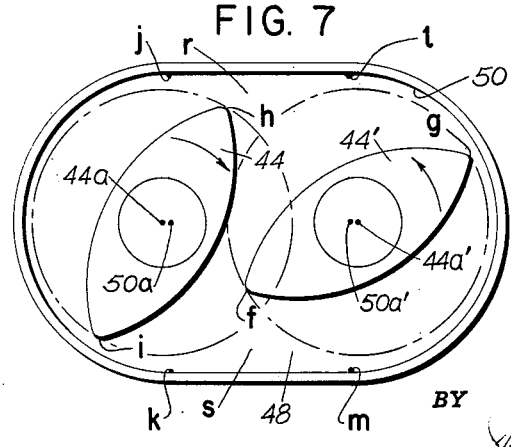

The action of the novel dough developing chamber with the twin arc paddles is illustrated diagrammatically in FIGS. 5, 6 and 7.

Referring to FIG. 5, it can be seen that the paddles counter-rotate 90° out of phase. Tip $f$ of paddle 44′ and the sides of paddle 44 have a relatively close clearance. In one installation we have found 0.5 inch to be successful.

The inside peripheral surface 50 of the chamber 48 is formed so that its cross-section comprises two spaced semi-circles $jk$ and $lm$ and two parallel tangents $jl$ and $km$. The portion $lm$ is a semi-circle having the same radius as the portion $jk$. The sections $jl$ and $km$ are equal tangential sections of the semi-circles. The length of $jl$ and $km$ is determined by the necessary spacing of the semi-circle to contain the sweep of the paddles when positioned as shown in the drawings with the further provision that paddle tip clearance in the semi-circular sections is small. In one installation in which the bowl height was 12 inches, width 19.5 inches and longitudinal depth 16 inches, the clearance of the paddle tips at the midpoint of the semi-circle was 0.5 inch while the tip clearance of the paddle in its vertical position was 0.75 inch. This results from locating each paddle so that the path of travel of its tip passes closest to the face or surface 50 at a point midway between the point $j$ and $k$ (or $l$ and $m$) as illustrated by the dot-dash line. In the instant case in which the arc $jk$ ($lm$) is of constant radius, this is accomplished by offsetting the center point 44$a$ (44′$a$) of the paddle from the center point 50$a$ (50′$a$) of the arc $jk$ ($lm$). It is obvious that an equivalent result can be obtained by opening the arc $jk$ ($lm$) at its extremities.

As heretofore explained, the sides of the paddles each constitute a 90° arc. However, these arcs could be more or less than 90° or of a non-uniform convexity, but for the same size paddle, the dimension of the bowl and distance between paddle centers would have to be increased or decreased as may readily be understood, if other than a 90° arc is selected. We have, however, found that the 90° arc appears to be optimal to produce the proper relation of stretch, compression and shear and proper dough flow during the operative dynamics of the developer.

By comparing FIGS. 5, 6 and 7, it may be seen that when the bowl is filled full with dough, the dough is subjected to pulsating alternate compression and relative relief between the areas $r$ and $s$. At the same time the dough is subjected to stretching, compression and shearing forces as it is swept by the paddle tip through the semi-circle portions $jk$ and $lm$ of the bowl. There is an additional similar action between the paddles in the position illustrated in FIG. 5. It can also be readily appreciated that each paddle has a wiping action on the other paddle preventing stagnation. Also, the smooth contours of the paddles provide streamlined dough flow which prevents surface stagnation. Additionally, area and surface stagnation is prevented by the positive pumping action from the bottom area $s$ to the top area $r$.

In operation, dough is charged into the mixer through the port 64 under positive feed pressure to completely fill the mixing bowl. The paddles are rapidly rotated. In one installation, the speed was on the order of 90 r.p.m. to 250 r.p.m. The restricted opening 70 produces a back pressure within the system which serves not only to provide a steady uniform flow through the mixer without any areas of stagnation but we have also found it is essential for complete, rapid and uniform development of the dough. Pressure at different points within the mixer varies considerably due not only to flow characteristics but also to the pulsating pump-like action from the area $s$ to the area $r$ produced by the novel rotating paddles. For example, in one installation the pressure in the center of the mixer over the area $r$ was found to be 25 p.s.i.g. while the pressure at the bottom of the mixer at the area $s$ was found to be 10 p.s.i.g. As the paddle tips move past the walls of the semi-circles of the chamber, a stretching and shearing action is produced on the dough mass as it is drawn out or wiped along the inner walls of the semi-circular portion. The advantageous shearing action produced is one wherein particles of the mix are displaced or slide relative to one another in the direction of movement of the paddle tips thereby orienting the particles. The shearing action produced appears to orient the particles but is sufficiently mild so that particle fracture which degrades the dough does not occur.

The dough portion moved ahead of the paddles is then compressed in the area $r$ and an additional stretching and shearing action occurs as the tip of one paddle moves past the hub of the other paddle. Finally an expansion and stretching of the dough is permitted as the paddles draw apart in the area $s$. Thus on each cycle of a tip there is a pulsating compression and stretching. This pulsating, compressing, shearing and stretching action has been found to have a very rapid and highly efficient developing action on the dough, permitting a very high throughput. In one installation an hourly throughput of 4,000 to 6,000 pounds of highly developed and remarkably uniform dough was achieved on a mixer having a static volumetric capacity of 98 pounds. After the dough moves through the restricted opening 70 it is gently and gradually expanded in the adjustable shaper throat 72. The gradually expanding and then contracting contours of the cross-sectional area of the throat prevent stagnation within the throat and provide a smooth surface to the dough. The cross-sectional area of the delivery duct 80 is larger than the cross-sectional area of the restricted opening 70. It has been found that gently expanding the dough and then slightly compressing it before delivery improves the uniformity of the flow and produces in the ultimate baked loaf a more uniform grain and crust color.

It should be noted that the pulsating pressure changes take place twice in each area ($r$ or $s$) per rotation of each paddle and this, of itself, lends a kneading or developing action four times per rotation per paddle. Additionally, there is the gross change in pressure between the area $r$ and area $s$ occasioned by the combined pumping action of the paddles and the pressure drop in the passage of the mix from port 64 to opening 70.

Returning to the movement of the paddle tips about the semi-circular sides, a principal action on the dough during the shearing is that of gas bubble subdivision and dispersion throughout the dough. This continuous subdivision of the gases throughout the mass of dough allows development of a uniform and fine bubble dispersion so necessary to produce a uniformly fine grain or crumb structure in the ultimate loaf. This bubble subdivision is obviously continued in the co-action of the paddles.

It should be particularly noted that the entry port is located in the center of the arc of one of the semi-circles and at the opposite end of the mixer (rearward) from the location of the restricted opening 70. The location in the center of the arc of one of the semi-circular arcs provides immediate mixing upon entry of the ingredients with the mass of dough in the mixer since it is at the point of the wall most closely adjacent a paddle tip.

It should further be noted that the slot 70 is located between the paddles and is positioned with its long axis running transversely to the axis of the paddles. Thus the diverging movement of the paddle tips tends to align the developed dough parallel to the slot 70. This alignment is then maintained throughout the discharge flow.

The mixing chamber and the paddles as viewed, for example, in FIG. 3 are of constant diameter and the size of the surface 52 substantially the same as the surface 51. However, it may be readily understood that the cylindrical chamber need not be a right cylinder but could be a similar figure diminishing in cross-section. It is felt that it is not necessary to illustrate such alternate shapes in the drawings. It is further emphasized that the words "cylinder" or "cylindrical" as used in the claims shall include such alternate forms insofar as the structure does not otherwise depart from the spirit and structure asserted in the claims. Obviously the paddles must be of conforming design.

We claim:

1. A closed mixer adapted to apply intensive stretch, compression and shear on plasticizable material treated therein, said mixer comprising an elongated housing having a chamber formed therein, said chamber formed in cross-section as a pair of connected outwardly bowed spaced arcs, a pair of counter-rotating paddles mounted to rotate substantially 90° out of phase and about an axis extending longitudinally of said chamber, the radius of sweep of each of said paddles being of a magnitude almost as great as the radius of said arcs of said chamber, said paddles being mounted for rotation so that the center of rotation of each is offset from the center of the respective arc near thereto toward the concavity thereof so that upon rotation the tips of each of said paddles will be spaced farther from the extremities of the arcs adjacent thereto than from the centers thereof, means to continuously charge said chamber with said plasticizable material under pressure, and restricted delivery means in said chamber to deliver plastic material from said chamber while maintaining positive back pressure therein.

2. A dough developer having means for continuously developing dough from the ingredients of dough, said developer comprising a closed pressurized dough mixing chamber, said chamber having a horizontal top surface and a horizontal bottom surface, said surfaces joined together by a left-hand side member and a right-hand side member, each of said side members having an outwardly convex half cylindrical surface, said chamber having a front and rear end, an ingress port in one of said side members near one end of said chamber, said ingress port communicating with an ingress duct through which said ingredients are continuously supplied under pressure, an egress port in said bottom surface, near the opposite end of said chamber from said ingress port, through which the developed dough is continuously delivered, said egress port being a narrow elongated slot, so as to produce back pressure as said developed dough is forced through it, a total of two mixing paddles in said chamber, each of said paddles rotatably mounted on an individual horizontal axis supported in said ends, means for rotating the first one of said two paddles clockwise and the second one of said two paddles counterclockwise and ninety degrees out of phase with respect to said first paddle, each of said paddles having oppositely bowed surfaces, each of said bowed surfaces being a single continuous arc of substantially ninety degrees extending from near said top surface of said developer to near said bottom surface of said developer when said paddles are upright, each of said paddles extending from near one of said ends to near the other of said ends, said axes so spaced one from another that the tips of each paddle sweep close to the adjacent half-cylindrical surface and each of said tips sweeps close to a respective surface of the other paddle, to prevent stagnation of dough, said mixing chamber having an upper mixing space overlying said paddles and a lower mixing space underlying said paddles, said paddles and said ports arranged and disposed in relation one to another, and in relation to the inner contour of said chamber, so as to produce approximately fifteen pounds per square inch greater pressure in said upper space than in said lower space, when said developer is in operation, to create an expansion and stretching of said dough during each revolution of said paddles, to thereby expedite the processing of dough in said developer and to improve the quality of the resultant bread.

3. A dough developer having a closed pressurized dough mixing chamber, said chamber consisting of a first half-cylindrical section connected directly through a middle rectangular section to a second half-cylindrical section, said middle section having a horizontal top surface and a horizontal bottom surface, each of said surfaces tangential with each of said half-cylindrical sections, said chamber having two vertical ends, an ingress port communicating with a duct arranged for receiving the dough ingredients under pressure, said port being located in one of said half-cylindrical sections, midway between said top and bottom surfaces, near one of said ends, a narrow elongated egress port in said bottom surface, for delivery of the developed dough, said egress port positioned parallel to and near the opposite end of said chamber from said ingress port, said chamber having a total of two mixing paddles, said paddles counter-rotating, each of said paddles mounted on an individual horizontal rotating shaft secured in said ends, said paddles rotatable ninety degrees out of phase, each of said paddles having opposed outwardly bowed faces, said faces extending in a uniform continuous arc from near said top surface to near said bottom surface when said paddles are in a vertical position, said paddles extending longitudinally from near one end to near the other end of said chamber, said paddles so spaced that each of said paddles when rotating sweeps near to, and closest to, the middle portion of the inner surface of its adjacent half-cylindrical section and the two paddles are substantially self-wiping, an upper mixing space overlying said paddles, a lower mixing space underlying said paddles, said paddles, ports and chamber coacting to produce a substantially greater pressure in said upper space than in said lower space, to expand and stretch said dough during each rotation of said paddles, to expedite dough development and to improve the resultant product.

4. A dough developer having a closed pressurized mixing chamber, a rotatable mixing paddle mounted on a horizontal shaft in said chamber, said paddle having a tip, said chamber having a concave half-cylindrical wall, said wall having a middle section closely conforming to an arc of the path of rotation of said paddle tip, an ingress port to said chamber for the ingredients of dough, said port being located in said middle section, so that said ingredients are engaged by said paddle immediately upon their entrance into said chamber.

5. A dough developer in accordance with claim 4, in which said chamber has two opposed ends and a bottom and in which said ingress port is near one of said ends and said chamber has an egress port for the developed dough, said egress port being an elongated slit in said bottom, said slit near the opposite end of said chamber from said ingress port.

6. A dough developer, said developer comprising a closed pressurized chamber having two ends, said chamber having at least two dough mixing elements therein, means for mounting and rotating said elements with respect of one to another and with respect of both to said chamber, to produce a pressure of a first substantially uniform predetermined value in a first space extending from one to another of said ends in said chamber, and to produce a pressure of a second substantially uniform predetermined value, substantially lower than said first value, in a second space extending from one to another of said ends in said chamber, said second space opposed to said first space in said chamber, and an egress port, said port communicating with said chamber of said second lower pressure value, whereby to deliver dough from said chamber of lowered pressure.

7. A closed mixing device capable of high work output and suitable for developing dough, comprising a housing, a chamber in said housing substantially oval in cross-section, said chamber consisting of two spaced, hollow, half right-cylinders interconnected by tangential surfaces and opposed ends, a total of two paddles mounted for rotation in said chamber, said paddles counter-rotating and extending substantially the entire longitudinal extent of said chamber, each of said paddles being formed in cross-section as two curves joined at their ends and bowed away from each other to form a pair of tips and an intermediate hub area, said paddles being constructed and arranged to sweep during rotation substantially the entire chamber, the tip of one paddle passing close to the hub of the other paddle, means to deliver a raw dough mix into said chamber to substantially fill the space in said chamber about said paddles, an inlet port formed in a rounded portion of said oval near one end of said chamber, and a relatively smaller outlet port in a straight portion of said oval near the opposite end of said chamber.

8. A dough developer, said developer having a pressurized mixing chamber having a continuous flow therethrough; and means for controlling the rate of outflow from said chamber said means comprising, a narrow slit-like orifice in a wall of said mixing chamber through which developed dough flows, said means further comprising a throat-like flow-controlling chamber communicating at one end with said orifice and having side walls extending in the direction of flow and terminating in a dough delivery duct, the chamber having a larger cross-sectional area transversely of the flow at its central portion tapering to smaller cross-sectional areas respectively adjacent to the orifice and the delivery duct, and tapered lug means in the chamber whose breadth is commensurate with the length of the orifice slit and whose length extends along a major portion of the length of the throat in the direction of flow, and the said lug means being adjustable relative to the said side walls to restrict the cross-sectional area of the central portion of the flow-controlling chamber.

9. A dough developer having means for continuously developing dough from the ingredients of dough, said developer comprising a closed pressurized mixing chamber, said chamber having an egress orifice for delivering a flow of developed dough, said orifice being a narrow elongated slit in the mixing chamber; and a flow-controlling chamber comprising opposed side walls forming an expanded throat communicating with the slit and extending a substantial distance in the direction of flow and terminating in a dough delivery duct of smaller area than the transverse cross-sectional area of the flow-controlling chamber, at least one side wall which extends in the direction of the length of the slit having an area which is relatively large as compared with any cross-sectional area of the throat taken transversely of the direction of flow and the major portion of the area of said one side wall comprising a lug plate movably mounted in the flow-controlling chamber so that the extent of its separation from an opposite side wall can be adjusted to change the volume and shape of the flow-controlling chamber between the orifice and the dough delivery duct.

References Cited in the file of this patent

UNITED STATES PATENTS

| 1,530,020 | Tiedke | Mar. 17, 1925 |
| 2,351,706 | Robinson | June 20, 1944 |
| 2,882,839 | Kruder | Apr. 21, 1959 |
| 2,883,162 | Rapson | Apr. 21, 1959 |

FOREIGN PATENTS

| 735,184 | Great Britain | Aug. 17, 1955 |